US012761022B1

(12) United States Patent
Crespo

(10) Patent No.: US 12,761,022 B1
(45) Date of Patent: Oct. 13, 2026

(54) LASER LEVEL WITH REMOTE CONTROL SYSTEM

(71) Applicant: Pedro Crespo, Jamaica, NY (US)

(72) Inventor: Pedro Crespo, Jamaica, NY (US)

( * ) Notice: Subject to any disclaimer, the term of this patent is extended or adjusted under 35 U.S.C. 154(b) by 316 days.

(21) Appl. No.: 18/636,397

(22) Filed: Apr. 16, 2024

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC ............................ G01C 9/06; G01C 2009/066
See application file for complete search history.

(56) References Cited

U.S. PATENT DOCUMENTS 5,610,711 A 3/1997 Rando
5,621,975 A 4/1997 Rando
6,762,830 B1 7/2004 Connolly
7,152,334 B2 12/2006 Gamal
D564,922 S 3/2008 Ishii
8,745,884 B2 * 6/2014 Hayes .................. G01C 15/006 33/1 G
8,826,553 B2 9/2014 Kahle
10,145,676 B2 * 12/2018 Hayes ..................... G01S 17/89
10,677,592 B2 * 6/2020 Lukic ....................... G01C 9/06
11,226,199 B2 * 1/2022 Unger ...................... G01C 3/08
11,320,263 B2 * 5/2022 Eidinger .............. G01C 15/004
11,754,393 B2 * 9/2023 Gould .................. G01C 15/004 33/228
11,846,507 B2 * 12/2023 Eidinger .............. G01C 15/004
11,953,342 B2 * 4/2024 Honoki .................. G08C 17/02
12,181,309 B2 * 12/2024 Wong ............... G01R 19/16571
12,449,254 B2 * 10/2025 Honoki ..................... G01C 9/06
12,523,470 B2 * 1/2026 Caelwaerts .......... G01C 15/004
2023/0119676 A1 * 4/2023 Roudebush .......... G01C 15/105 33/228
2023/0221117 A1 * 7/2023 Ran ...................... G01C 15/004 33/290
2023/0324173 A1 * 10/2023 Sergyeyenko ......... F16M 11/18 33/290
2024/0019247 A1 * 1/2024 Gould .................. G01C 15/002
2024/0060776 A1 * 2/2024 Eidinger .............. G01C 15/004
2025/0020463 A1 * 1/2025 Puentes Flores .... G01C 15/006
2025/0137783 A1 * 5/2025 Yeomans ............. G01C 15/008

FOREIGN PATENT DOCUMENTS

WO 2022119818 6/2022

* cited by examiner

*Primary Examiner* — Yaritza Guadalupe-Mccall
(74) *Attorney, Agent, or Firm* — Kyle A. Fletcher, Esq.

(57) ABSTRACT

The laser level with remote control system may include a rotator, a remote control unit, and a laser level. The laser level may project at least one projected laser line onto one or more walls and/or a ceiling. The laser level may couple to the top of the rotator. Responsive to a wireless signal received from the remote control unit, the rotator may be operable to rotate the laser level to change the position and/or orientation of the at least one projected laser line. The height of the laser level may be adjusted up and down manually.

18 Claims, 5 Drawing Sheets

LASER LEVEL WITH REMOTE CONTROL SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of laser levels and remote control positioning systems, more specifically, a laser level with remote control system.

SUMMARY OF INVENTION

The laser level with remote control system may comprise a rotator, a remote control unit, and a laser level. The laser level may project at least one projected laser line onto one or more walls and/or a ceiling. The laser level may couple to the top of the rotator. Responsive to a wireless signal received from the remote control unit, the rotator may be operable to rotate the laser level to change the position and/or orientation of the at least one projected laser line. The height of the laser level may be adjusted up and down manually.

An object of the invention is to project one or more projected laser lines onto one or more walls and/or a ceiling.

Another object of the invention is to couple the laser level to the top of a rotator that may rotate the laser level to change the position and/or orientation of the one or more projected laser lines.

A further object of the invention is to rotate the laser level from a remote location using a remote control unit to turn a rotating platform on the rotator.

Yet another object of the invention is to manually adjust the height of the laser level on the rotator using an adjustment knob.

These together with additional objects, features and advantages of the laser level with remote control system will be readily apparent to those of ordinary skill in the art upon reading the following detailed description of the presently preferred, but nonetheless illustrative, embodiments when taken in conjunction with the accompanying drawings.

In this respect, before explaining the current embodiments of the laser level with remote control system in detail, it is to be understood that the laser level with remote control system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the laser level with remote control system.

It is therefore important that the claims be regarded as including such equivalent construction insofar as they do not depart from the spirit and scope of the laser level with remote control system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
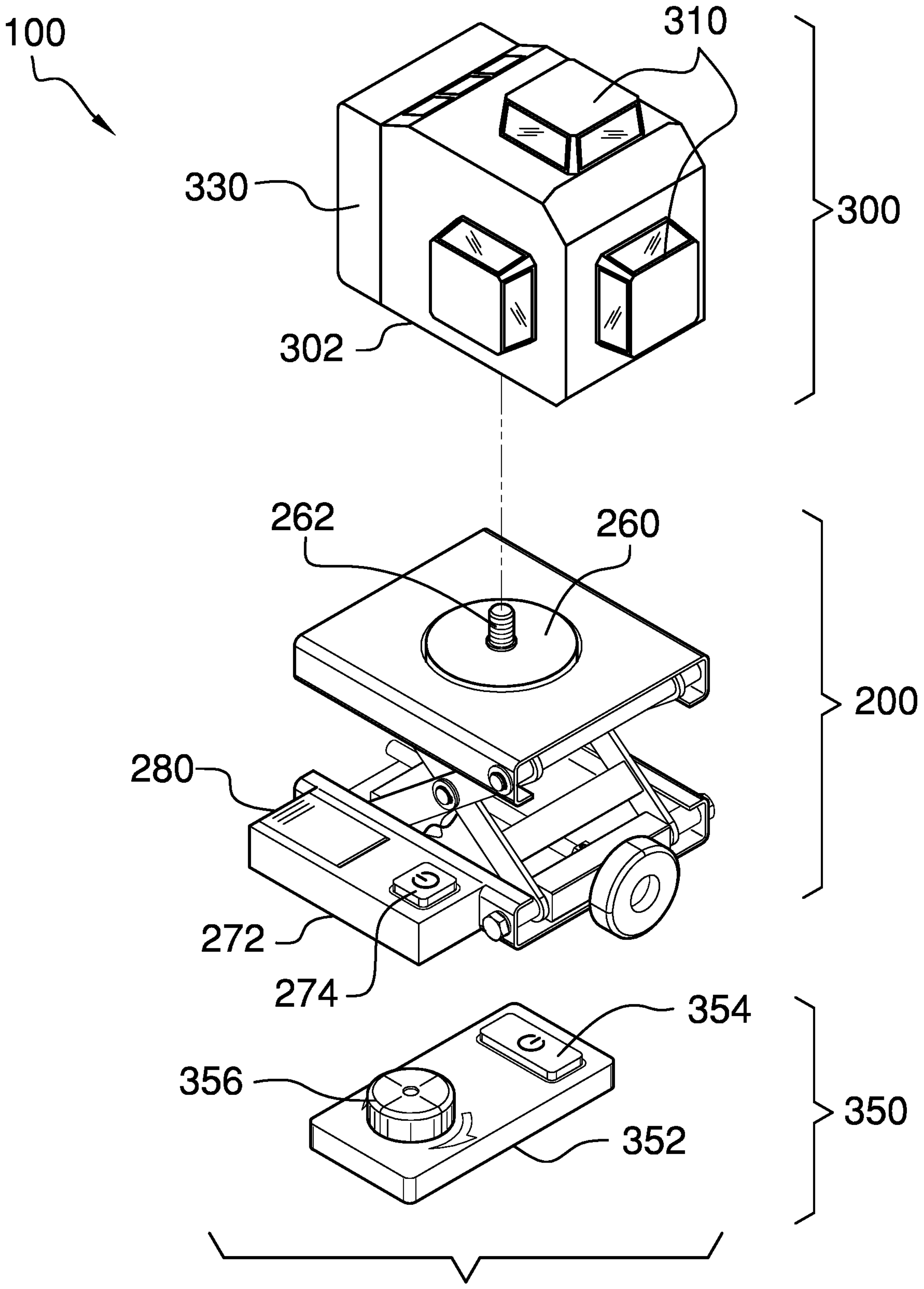
FIG. 1 is an isometric view of an embodiment of the disclosure.
Figure 2:
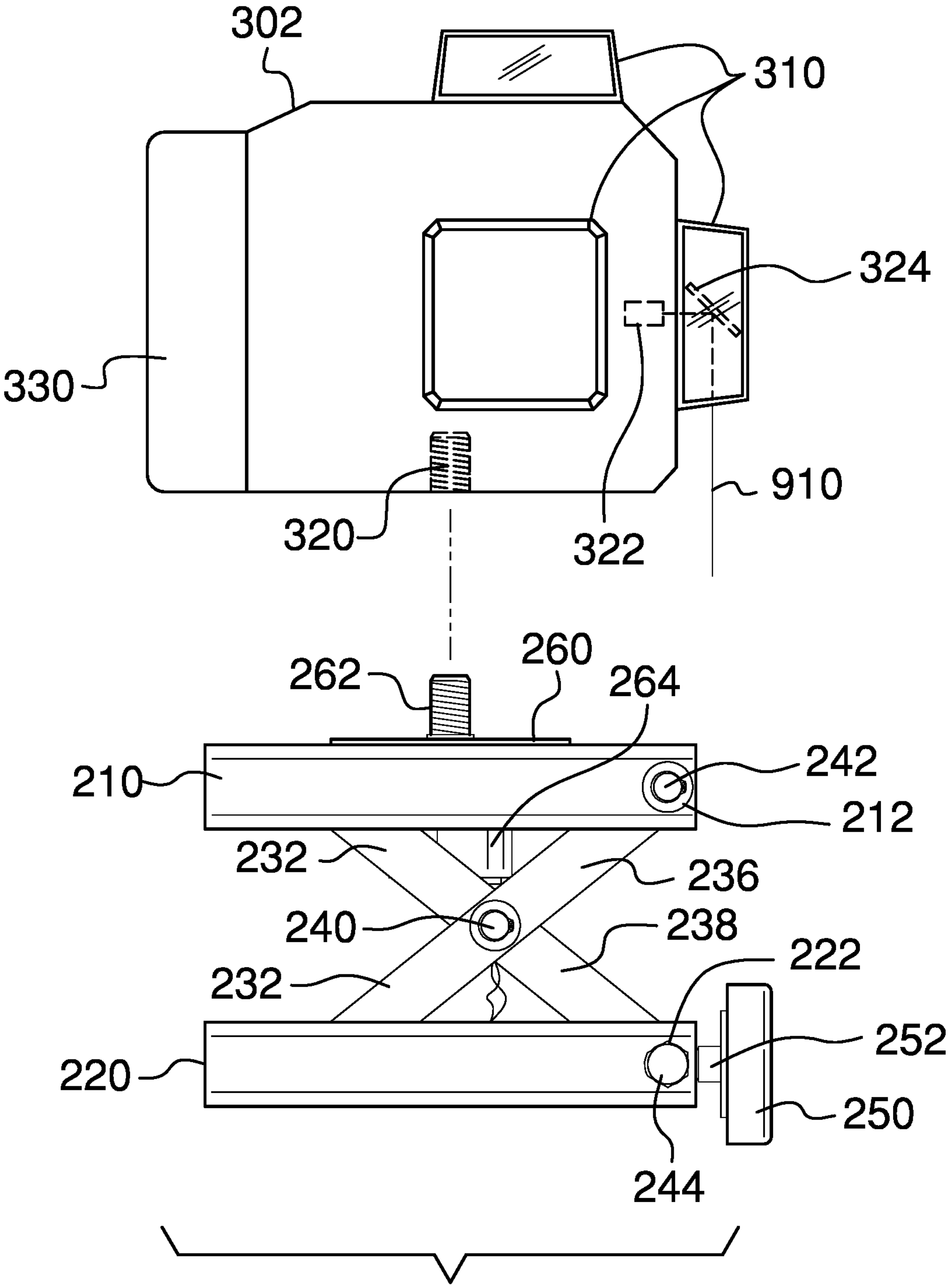
FIG. 2 is a left side in-use view of an embodiment of the disclosure.
Figure 3:
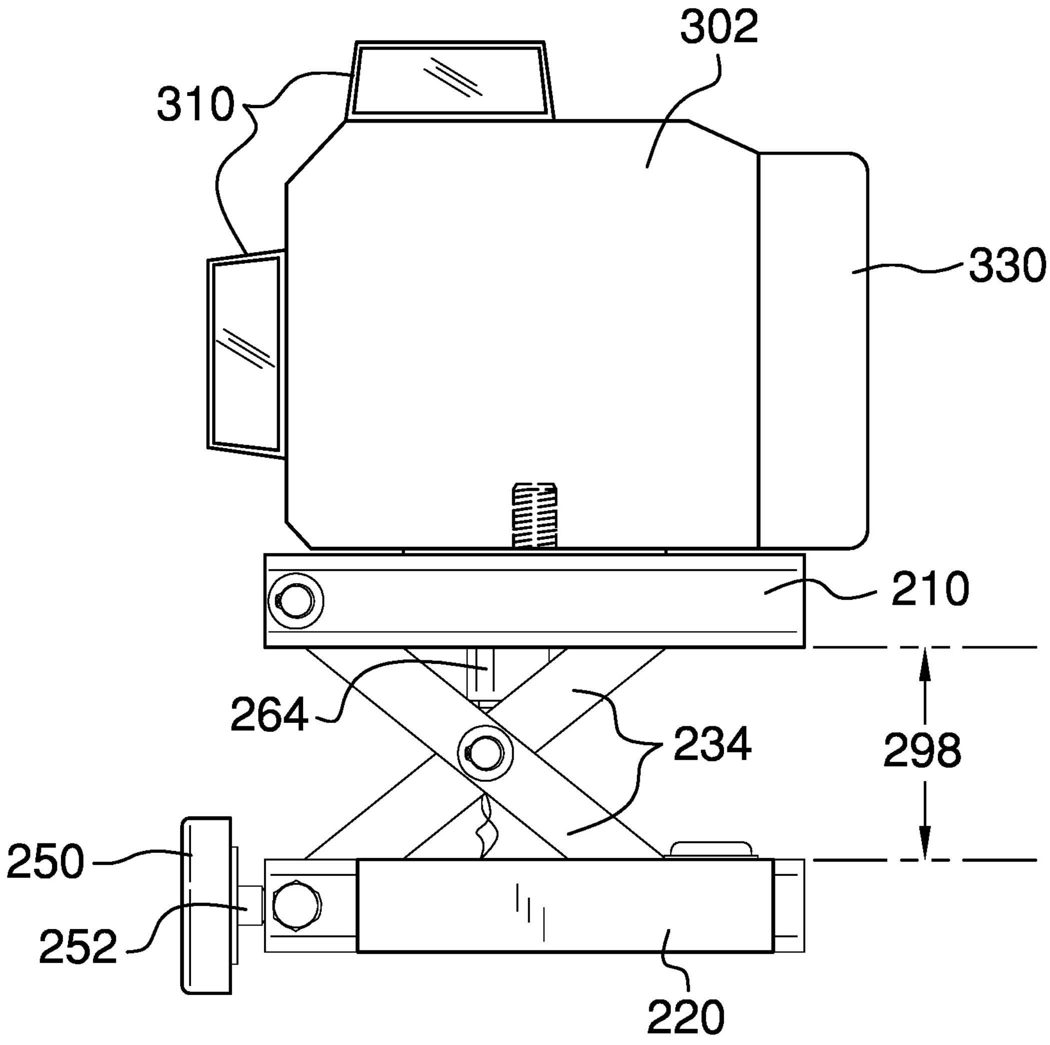
FIG. 3 is a right side in-use view of an embodiment of the disclosure.
Figure 4:
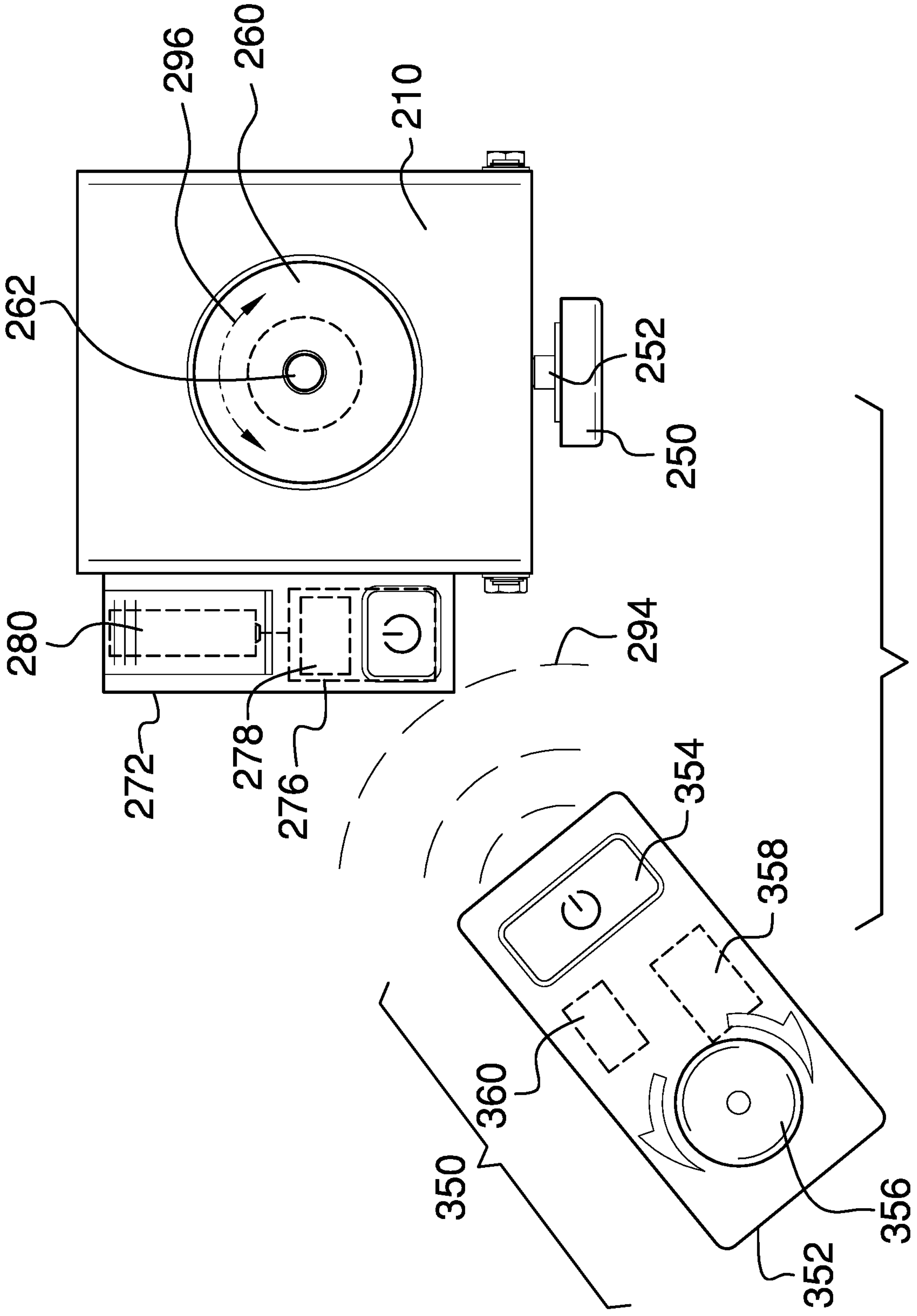
FIG. 4 is a top view of an embodiment of the disclosure, illustrating the rotator and remote control without the laser level in place.
Figure 5:
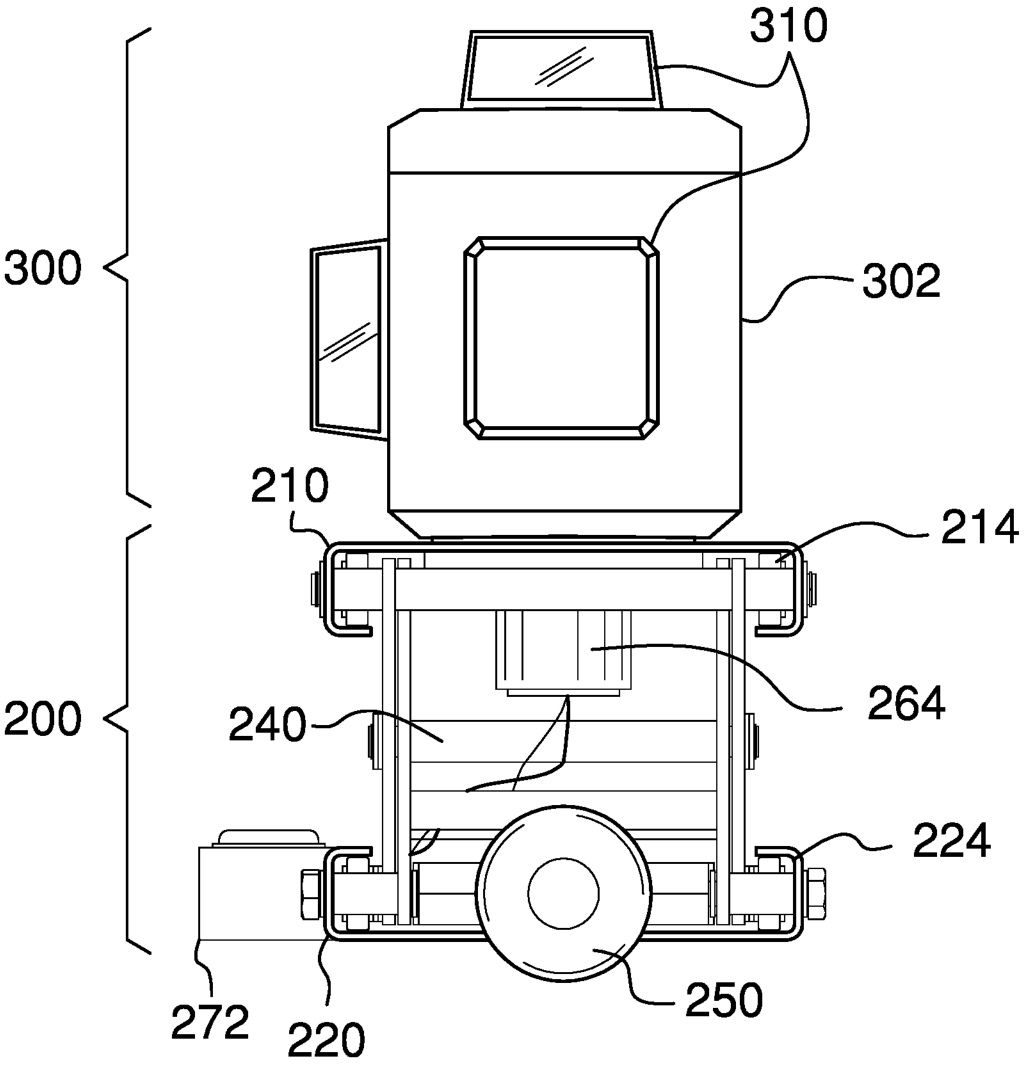
FIG. 5 is a front view of an embodiment of the disclosure.

Detailed reference will now be made to a first potential embodiment of the disclosure, which is illustrated in FIGS. 1 through 5.

The laser level with remote control system 100 (hereinafter invention) comprises a rotator 200, a remote control unit 350, and a laser level 300. The laser level 300 may project at least one projected laser line 910 onto one or more walls and/or a ceiling. The laser level 300 may couple to the top of the rotator 200. Responsive to a wireless signal 294 received from the remote control unit 350, the rotator 200 may be operable to rotate the laser level 300 to change the position and/or orientation of the at least one projected laser line 910.

The rotator 200 may comprise a frame, a rotating platform 260, a motor 264, and control electronics. The frame may provide a height-adjustable platform to support the laser level 300. The bottom of the laser level 300 may couple to the rotating platform 260 such that an azimuth angle 296 of the laser level may be changed. The motor 264 may rotate the rotating platform 260 responsive to activation of the remote control unit 350. The control electronics may receive the wireless signal 294 from the remote control unit 350. Responsive to receiving the wireless signal 294, the control electronics may energize the motor 264.

The frame may comprise an upper deck 210, a lower deck 220, and a height adjustment mechanism. The upper deck 210 and the lower deck 220 may be horizontally oriented structures with the upper deck 210 positioned above the lower deck 220. The laser level 300 may be mounted above the upper deck 210. The lower deck 220 may rest upon a work surface or may be coupled to a tripod. The height adjustment mechanism may establish a separation distance 298 between the upper deck 210 and the lower deck 220. The height adjustment mechanism may be adapted to manually change the separation distance 298.

The height adjustment mechanism may comprise a pair of left side supports 232, a pair of right side supports 234, a central axle pin 240, a top front bar 242, a bottom front bar 244, a top rear bar, a bottom rear bar, an adjustment knob 250, and an adjustment shaft 252. The pair of left side supports 232 may be located on the left side of the height adjustment mechanism and the pair of right side supports 234 may be located on the right side of the height adjustment mechanism. An individual pair of side support selected from the pair of left side supports 232 and the pair of right side supports 234 may comprise a first side support 236 and a second side support 238. The center of the first side support 236 may be pivotably coupled to the center of the second side support 238. The centers of the pair of left side supports 232 and the pair of right side supports may be pivotably coupled via the central axle pin 240.

The top of the first side support 236 on the pair of left side supports 232 may be coupled to the top of the first side support 236 on the pair of right side supports 234 via the top front bar 242. The top front bar 242 may be pivotably coupled to the upper deck 210 at a pair of upper pivot points 212. The bottom of the second side support 238 on the pair of left side supports 232 may be coupled to the bottom of the second side support 238 on the pair of right side supports 234 via the bottom front bar 244. The bottom front bar 244 may be pivotably coupled to the lower deck 220 at a pair of lower pivot points 222. The top of the second side support 238 on the pair of left side supports 232 may be coupled to the top of the second side support 238 on the pair of right side supports 234 via the top rear bar. The top rear bar may be slidably coupled to an upper track 214 of the upper deck 210. The bottom of the first side support 236 on the pair of left side supports 232 may be coupled to the bottom of the first side support 236 on the pair of right side supports 234 via the bottom rear bar. The bottom rear bar may be slidably coupled to a lower track 224 of the lower deck 220.

The adjustment shaft 252 may be horizontally oriented. The adjustment shaft 252 may pass through an aperture in the bottom front bar 244 and may be free to rotate within the bottom front bar 244 without moving forward or backwards. The adjustment shaft 252 may be threadedly coupled to the bottom rear bar. Rotating the adjustment shaft 252 in a first rotational direction may pull the bottom rear bar forward and may raise the upper deck 210. Rotating the adjustment shaft 252 in a second rotational direction may push the bottom rear bar rearward and may lower the upper deck 210. The adjustment knob 250 may be coupled to the front of the adjustment shaft 252. The adjustment knob 250 may be adapted to be grasped by a user in order to change the height of the upper deck 210.

The upper deck 210 may comprise the rotating platform 260. The top of the rotating platform 260 may align vertically with the top of the upper deck 210. The rotating platform 260 may rotate separately from the upper deck 210. The rotating platform may comprise mounting hardware 262 that my couple to the bottom of the laser level 300 to retain the laser level 300 on the rotating platform 260. The motor 264 coupled to the underside of the upper deck 210 may rotate the rotating platform 260 when the motor 264 is energized. The polarity of the energization may determine which direction the rotating platform 260 turns. The motor 264 may be energized by the control electronics, responsive to receiving the wireless signal 294 from the remote control unit 350.

The control electronics may be housed in an electronics housing 272 coupled to a side of the rotator 200. The control electronics may comprise a microcontroller 276 and a receiver 278. The microcontroller 276 may be electrically coupled to the receiver 278 and to the motor 264. The microcontroller 276 may control the energization of the motor 264. Responsive to receiving the wireless signal 294 from the remote control unit 350 that indicates rotation of a pan control 356, the microcontroller 276 may energize the motor 264 using a polarity that rotates the motor 264 in the same rotational direction. The rotator 200 may be powered by a first battery 280. A power control 274 may be actuated to turn the rotator 200 on and off.

The remote control unit 350 may send the wireless signal that controls the motor 264 for the rotating platform 260. The remote control unit 350 may therefore change the azimuth angle 296 of the laser level 300 from a remote location. As a non-limiting example, the remote control unit 350 may change the azimuth angle 296 of the laser level 300 from across the room. The remote control unit 350 may comprise a transmitter 360, an activation control 354, the pan control 356, a second battery 358 housed within a remote control housing 352.

The transmitter 360 may send the wireless signal 294 to the receiver 278 in the control electronics such that rotation of the pan control 356 on the remote control unit 350 may result in rotation of the laser level 300. As non-limiting examples, the wireless signal 294 may be an RF signal or an IR signal. The activation control 354 may activate and de-activate operation of the remote control unit 350. The pan control 356 may be turned to rotate the laser level 300 when the remote control unit 350 is activated. The second battery 358 located within the remote control unit 350 may provide electrical power for the remote control unit 350.

The laser level 300 may project the at least one projected laser line 910 onto the one or more walls and/or the ceiling. The laser level 300 may comprise a laser housing 302 with one or more laser windows 310. An individual projected laser line May be projected from each of the one or more laser windows 310. The at least one projected laser line 910 may be used to verify or determine the placement of objects. As non-limiting examples, the objects may be construction materials, wall hangings, or shelving. In a preferred embodiment, there may be three laser windows such that the individual projected laser lines may be projected in front of, above, and to at least one side of the laser level 300.

An individual laser window selected from the one or more laser windows 310 may comprise a protrusion that extends away from the center of the laser level 300. The individual laser window may house a spinning mirror 324. The spinning mirror 324 may be oriented at an angle of 45 degrees relative to an orthogonal axis through the laser level 300 such that the spinning mirror 324 may reflect a laser beam into a plane that is parallel to the side of the laser level 300 where the individual laser window is located. The individual laser window may comprise four apertures that are placed orthogonally to each other such that the laser beam may exit the laser housing 302. Because the laser beam is reflected by the spinning mirror 324, the individual laser window may display the individual projected laser line for 360 degrees around the individual laser window.

The bottom of the laser housing 302 may comprise a mounting aperture 320. The mounting aperture 320 may enable the laser housing 302 to be mounted onto the rotator 200 or onto the tripod.

The laser level 300 may further comprise one or more laser light sources 322. There may be an individual laser light source for each of the one or more laser windows 310. For each of the one or more laser light sources 322, the individual laser light source may be oriented to point at the spinning mirror 324 along the axis of rotation of the spinning mirror 324 such that the individual laser light source strikes the center of the spinning mirror 324 at a 45 degree angle with respect to the spinning mirror 324. As a non-limiting example, the individual laser light source may be a laser diode.

The laser level 300 may be powered by a third battery 330 that mounts to a side of the laser housing 302.

The laser level 300 may comprise a self-leveling mechanism that may orient the at least one projected laser lines 910 to be orthogonal to the field of gravity. As a non-limiting example, the self-leveling mechanism may comprise a pendulum that adjusts the orientation of the one or more laser light sources 322 and/or the spinning mirrors 324 responsive to a change of orientation of the laser housing 302.

In use, the laser level 300 may be coupled to the top of the rotator 200 and the rotator 200 may be placed within a construction site such that the laser level 300 projects at least one projected laser line 910 onto one or more walls, a ceiling, or any combination thereof. As non-limiting examples, the rotator 200 may be mounted to a tripod or placed on a work surface. The user may approach a wall where an individual projected laser line is displayed. The user may operate the remote control unit 350 to rotate the laser level 300 such that the individual projected laser line is shifted to the right or left until the individual projected laser line aligns with a known reference mark. The user may use the individual projected laser line to align one or more objects. As non-limiting examples, the objects may be construction materials, wall hangings, or shelving. Without returning to the laser level 300, the user may operate the remote control unit 350 to rotate the laser level 300 such that the individual projected laser line is shifted to the right or left until the individual projected laser line aligns with another one of the known reference marks.

DEFINITIONS

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used in this disclosure, an “aperture” may be an opening in a surface or object. Aperture may be synonymous with hole, slit, crack, gap, slot, or opening.

As used in this disclosure, the “azimuth” or azimuth angle, refers to an angle that is measured in a plane that is perpendicular to the either the vertical direction or the force of gravity.

Throughout this document the terms “battery”, “battery pack”, and “batteries” may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words “couple”, “couples”, “coupled” or “coupling”, may refer to connecting, either directly or indirectly, and does not necessarily imply a mechanical connection.

As used herein, “energize” and/or “energization” may refer to the application of an electrical potential to a system or subsystem. “De-energize” and/or “de-energization” may refer to the removal of the electrical potential.

As used herein, “front” may indicate the side of an object that is closest to a forward direction of travel under normal use of the object or the side or part of an object that normally presents itself to view or that is normally used first. “Rear” or “back” may refer to the side that is opposite the front.

As used in this disclosure, “horizontal” may be a directional term that refers to a direction that is perpendicular to the local force of gravity. Unless specifically noted in this disclosure, the horizontal direction is always perpendicular to the vertical direction.

As used in this disclosure, a “housing” may be a rigid or semi-rigid casing that encloses and protects one or more devices.

As used in this disclosure, a “microcontroller” may be a small computer, often on a single integrated circuit, containing a processor core, memory, and programmable input/output peripherals.

As used in this disclosure, a “motor” may refer to a device that transforms energy from an external power source into mechanical energy.

As used herein, “mounting hardware” may refer to mechanical devices that are used to attach one object to another, including devices whose only purpose is to improve aesthetics. As non-limiting examples, mounting hardware may comprise screws, nuts, bolts, washers, rivets, crossbars, hooks, collars, nipples, cams, standoffs, knobs, caps, plates, rails, lips, brackets, or any combination thereof.

As used in this disclosure, “orientation” may refer to the positioning and/or angular alignment of a first object relative to a second object or relative to a reference position or reference direction.

As used herein, the word “pivot” may include any mechanical arrangement that allows for rotational motion. Non-limiting examples of pivots may include hinges, holes, posts, dowels, pins, points, rods, shafts, balls, and sockets, either individually or in combination.

As used in this disclosure, “remote control” may refer to the establishment of control of a device from a distance or to the controlling device itself. Remote control is generally accomplished through the use of an electrical device that generates electrically based control signals that are transmitted via radio frequencies to the device. Some remote controls may use infrared light to communicate with a device.

As used herein, "RF" may refer to Radio Frequency. In general, an alternating electromagnetic field may be considered to be a radio frequency if the oscillation rate is between approximately 20 kHz and 300 GHz.

As used in this disclosure, a "tripod" may be a three legged stand that is used to support a visual recording device or other equipment.

As used in this disclosure, "vertical" may refer to a direction that is parallel to the local force of gravity. Unless specifically noted in this disclosure, the vertical direction is always perpendicular to horizontal.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A laser level with remote control system comprising:

a rotator, a remote control unit, and a laser level;

wherein the laser level projects at least one projected laser line onto one or more walls and/or a ceiling;

wherein the laser level couples to the top of the rotator;

wherein responsive to a wireless signal received from the remote control unit, the rotator is operable to rotate the laser level to change the position and/or orientation of the at least one projected laser line;

wherein the rotator is further defined with a frame;

wherein the frame comprises an upper deck, a lower deck, and a height adjustment mechanism;

wherein the upper deck and the lower deck are horizontally oriented structures with the upper deck positioned above the lower deck;

wherein the laser level is mounted above the upper deck;

wherein the lower deck rests upon a work surface;

wherein the height adjustment mechanism establishes a separation distance between the upper deck and the lower deck;

wherein the height adjustment mechanism is adapted to manually change the separation distance.

2. The laser level with remote control system according to claim 1 wherein the rotator comprises the frame, a rotating platform, a motor, and control electronics;

wherein the frame provides a height-adjustable platform to support the laser level;

wherein the bottom of the laser level couples to the rotating platform such that an azimuth angle of the laser level is variable;

wherein the motor rotates the rotating platform responsive to activation of the remote control unit;

wherein the control electronics receive the wireless signal from the remote control unit;

wherein responsive to receiving the wireless signal, the control electronics energize the motor.

3. The laser level with remote control system according to claim 2 wherein the height adjustment mechanism comprises a pair of left side supports, a pair of right side supports, a central axle pin, a top front bar, a bottom front bar, a top rear bar, a bottom rear bar, an adjustment knob, and an adjustment shaft;

wherein the pair of left side supports are located on the left side of the height adjustment mechanism and the pair of right side supports are located on the right side of the height adjustment mechanism;

wherein an individual pair of side support selected from the pair of left side supports and the pair of right side supports comprise a first side support and a second side support;

wherein the center of the first side support is pivotably coupled to the center of the second side support;

wherein the centers of the pair of left side supports and the pair of right side supports are pivotably coupled via the central axle pin.

4. The laser level with remote control system according to claim 3 wherein the top of the first side support on the pair of left side supports is coupled to the top of the first side support on the pair of right side supports via the top front bar;

wherein the top front bar is pivotably coupled to the upper deck at a pair of upper pivot points;

wherein the bottom of the second side support on the pair of left side supports is coupled to the bottom of the second side support on the pair of right side supports via the bottom front bar;

wherein the bottom front bar is pivotably coupled to the lower deck at a pair of lower pivot points;

wherein the top of the second side support on the pair of left side supports is coupled to the top of the second side support on the pair of right side supports via the top rear bar;

wherein the top rear bar is slidably coupled to an upper track of the upper deck;

wherein the bottom of the first side support on the pair of left side supports is coupled to the bottom of the first side support on the pair of right side supports via the bottom rear bar;

wherein the bottom rear bar is slidably coupled to a lower track of the lower deck.

5. The laser level with remote control system according to claim 4 wherein the adjustment shaft is horizontally oriented;

wherein the adjustment shaft passes through an aperture in the bottom front bar and is free to rotate within the bottom front bar without moving forward or backwards;

wherein the adjustment shaft is threadedly coupled to the bottom rear bar;

wherein rotating the adjustment shaft in a first rotational direction pulls the bottom rear bar forward and raises the upper deck;

wherein rotating the adjustment shaft in a second rotational direction pushes the bottom rear bar rearward and lowers the upper deck.

6. The laser level with remote control system according to claim 5 wherein the adjustment knob is coupled to the front of the adjustment shaft;

wherein the adjustment knob is adapted to be grasped by a user in order to change the height of the upper deck.

7. The laser level with remote control system according to claim 6 wherein the upper deck comprises the rotating platform;

wherein the top of the rotating platform aligns vertically with the top of the upper deck;

wherein the rotating platform rotates separately from the upper deck;

wherein the rotating platform comprises mounting hardware that my couple to the bottom of the laser level to retain the laser level on the rotating platform;

wherein the motor coupled to the underside of the upper deck rotates the rotating platform when the motor is energized;

wherein the polarity of the energization determines which direction the rotating platform turns;

wherein the motor is energized by the control electronics, responsive to receiving the wireless signal from the remote control unit.

8. The laser level with remote control system according to claim 7 wherein the control electronics are housed in an electronics housing coupled to a side of the rotator;

wherein the control electronics comprise a microcontroller and a receiver;

wherein the microcontroller is electrically coupled to the receiver and to the motor;

wherein the microcontroller controls the energization of the motor;

wherein responsive to receiving the wireless signal from the remote control unit that indicates rotation of a pan control, the microcontroller energizes the motor using a polarity that rotates the motor in the same rotational direction;

wherein the rotator is powered by a first battery;

wherein a power control is actuated to turn the rotator on and off.

9. The laser level with remote control system according to claim 8 wherein the remote control unit sends the wireless signal that controls the motor for the rotating platform;

wherein the remote control unit changes the azimuth angle of the laser level from a remote location;

wherein the remote control unit comprises a transmitter, an activation control, the pan control, a second battery housed within a remote control housing.

10. The laser level with remote control system according to claim 9 wherein the transmitter sends the wireless signal to the receiver in the control electronics such that rotation of the pan control on the remote control unit results in rotation of the laser level;

wherein the activation control activates and de-activates operation of the remote control unit;

wherein the pan control is turned to rotate the laser level when the remote control unit is activated;

wherein the second battery located within the remote control unit provides electrical power for the remote control unit.

11. The laser level with remote control system according to claim 10 wherein the laser level projects the at least one projected laser line onto the one or more walls and/or the ceiling;

wherein the laser level comprises a laser housing with one or more laser windows;

wherein an individual projected laser line is projected from each of the one or more laser windows.

12. The laser level with remote control system according to claim 11 wherein there are three laser windows such that the individual projected laser lines are projected in front of, above, and to at least one side of the laser level.

13. The laser level with remote control system according to claim 11 wherein an individual laser window selected from the one or more laser windows comprises a protrusion that extends away from the center of the laser level;

wherein the individual laser window houses a spinning mirror;

wherein the spinning mirror is oriented at an angle of 45 degrees relative to an orthogonal axis through the laser level such that the spinning mirror reflects a laser beam into a plane that is parallel to the side of the laser level where the individual laser window is located;

wherein the individual laser window comprises four apertures that are placed orthogonally to each other such that the laser beam exits the laser housing;

wherein because the laser beam is reflected by the spinning mirror, the individual laser window displays the individual projected laser line for 360 degrees around the individual laser window.

14. The laser level with remote control system according to claim 13 wherein the bottom of the laser housing comprises a mounting aperture;

wherein the mounting aperture enables the laser housing to be mounted onto the rotator or onto a tripod.

15. The laser level with remote control system according to claim 14 wherein the laser level further comprises one or more laser light sources;

wherein there is an individual laser light source for each of the one or more laser windows;

wherein for each of the one or more laser light sources, the individual laser light source is oriented to point at the spinning mirror along the axis of rotation of the spinning mirror such that the individual laser light source strikes the center of the spinning mirror at a 45 degree angle with respect to the spinning mirror.

16. The laser level with remote control system according to claim 15 wherein the individual laser light source is a laser diode.

17. The laser level with remote control system according to claim 15 wherein the laser level is powered by a third battery that mounts to a side of the laser housing.

18. The laser level with remote control system according to claim 17 wherein the laser level comprises a self-leveling mechanism that orients the at least one projected laser lines to be orthogonal to the field of gravity.

* * * * *